United States Patent [19]
Fontaine et al.

[11] Patent Number: 6,078,427
[45] Date of Patent: Jun. 20, 2000

[54] SMOOTH TRANSITION DEVICE FOR AREA OF INTEREST HEAD-MOUNTED DISPLAY

[75] Inventors: Jean-Jacques Fontaine, Eraghy/oise, France; Benedict J. Mall, San Marcos, Calif.

[73] Assignee: Kaiser Electro-Optics, Inc., Carlsbad, Calif.

[21] Appl. No.: 09/203,292

[22] Filed: Dec. 1, 1998

[51] Int. Cl.$^7$ .............................. G02B 27/14; G02B 9/00; G09G 5/00
[52] U.S. Cl. .............................. 359/630; 359/738; 345/7; 345/8; 345/9
[58] Field of Search ..................... 359/630–633, 359/738–739, 478; 345/7–9, 32

[56] References Cited

U.S. PATENT DOCUMENTS

| | | | |
|---|---|---|---|
| 3,402,977 | 9/1968 | La Russa et al. | 350/36 |
| 5,153,569 | 10/1992 | Kawamura et al. | 340/705 |
| 5,233,458 | 8/1993 | Moffitt et al | 359/227 |
| 5,487,665 | 1/1996 | Lechner et al. | 434/44 |
| 5,530,586 | 6/1996 | Yasugaki | 359/364 |
| 5,576,887 | 11/1996 | Ferrin et al. | 359/631 |
| 5,601,352 | 2/1997 | Okamura | 353/31 |
| 5,619,373 | 4/1997 | Meyerhofer et al. | 359/482 |
| 5,621,572 | 4/1997 | Fergason | 359/630 |
| 5,726,670 | 3/1998 | Tabata et al. | 345/7 |
| 5,808,589 | 9/1998 | Fergason | 345/8 |
| 5,825,539 | 10/1998 | Hoshi | 359/462 |

OTHER PUBLICATIONS

Melzer, J.E., et al., "An Ecological Approach to Partial Binocular–Overlap," SPEI, vol. 1456, (1991), pp. 124–131.

*Primary Examiner*—Georgia Epps
*Assistant Examiner*—David N. Spector
*Attorney, Agent, or Firm*—Charles J. Kulas; Townsend and Townsend and Crew, LLP

[57] ABSTRACT

A head-mounted display includes an aperture mask between the eye and a viewfinder to mask the line artifacts resulting from visible edges of mechanisms, such as imagers, within the display. The aperture has a translucent area that matches the geometry of the edge desired to be masked. In an application where a high-resolution image is presented to one eye, centered within a lower-resolution image presented to the other eye, the aperture is positioned to mask the edges of the high-resolution image source. In an application where see-through is desired, the opaque area is sacrificed in favor of a partially transparent mask. The translucent area can be graduated so that a smooth transition area between the edges of the high-resolution display and the lower-resolution display is achieved.

9 Claims, 5 Drawing Sheets

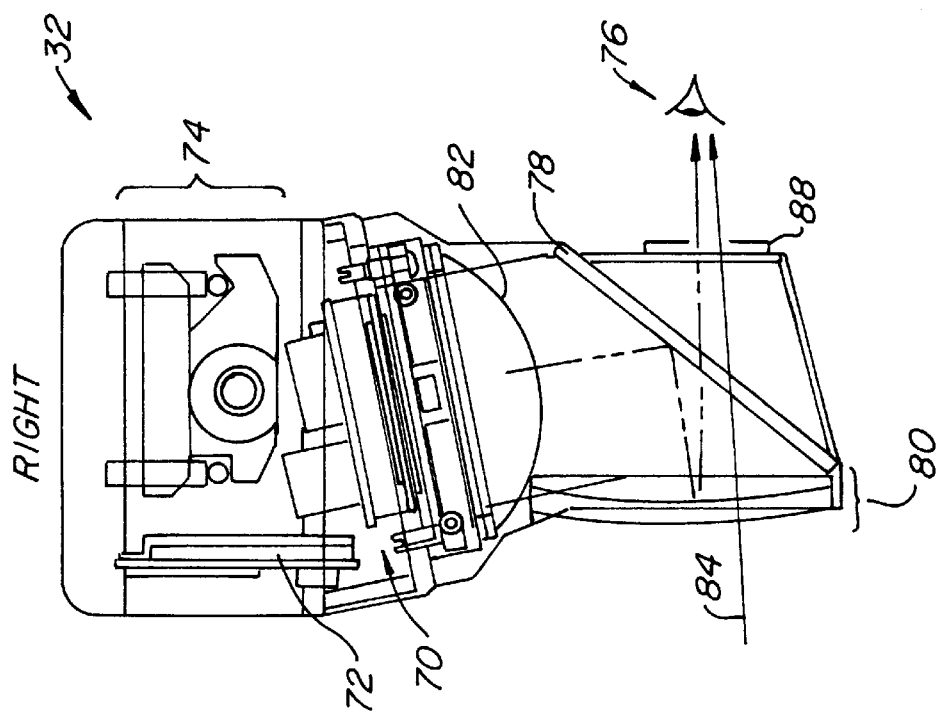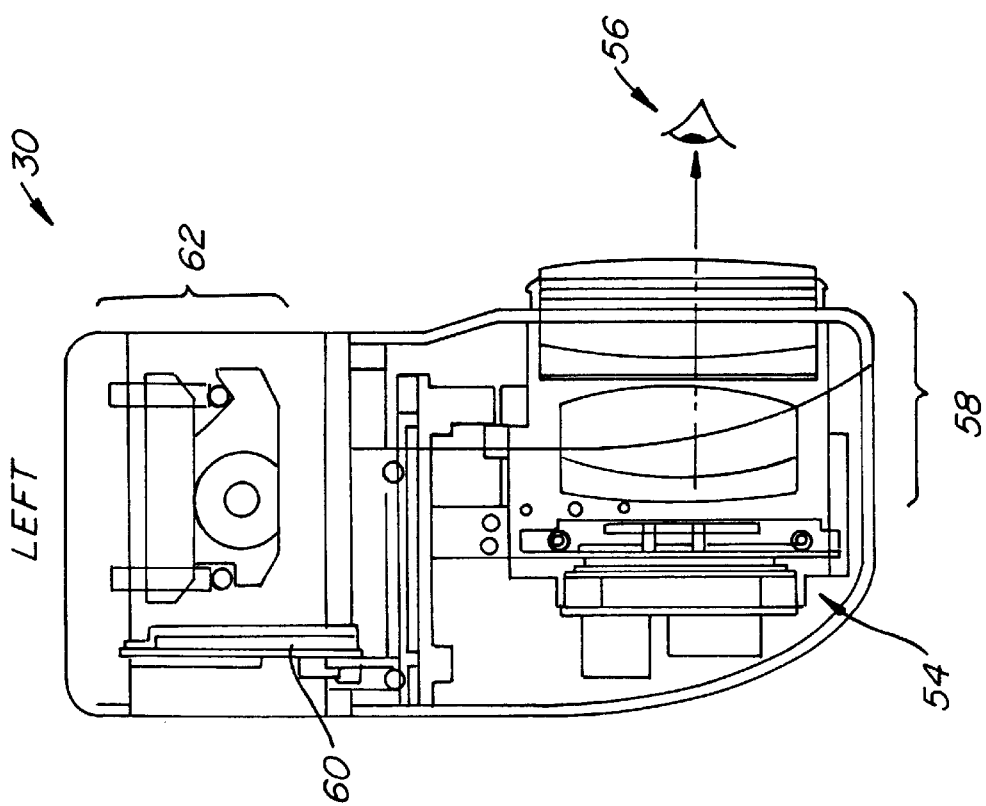
FIG. 3.

SMOOTH TRANSITION DEVICE FOR AREA OF INTEREST HEAD-MOUNTED DISPLAY

CROSS REFERENCE TO RELATED APPLICATION

This invention is related to co-pending patent application Ser. No. 09/203,293 filed Dec. 1, 1998 entitled "AREA OF INTEREST HEAD-MOUNTED DISPLAY USING LOW RESOLUTION, WIDE ANGLE; HIGH RESOLUTION, NARROW ANGLE; AND SEE-THROUGH VIEWS" hereby incorporated by reference.

BACKGROUND OF THE INVENTION

This invention relates in general to display systems and more specifically to binocular systems presenting different views from electronic image sources.

Head-mounted displays (HMDs) are useful for immersing a viewer in an artificial, or enhanced, visual world. Uses for HMDs include simulation systems, virtual reality applications, night vision, infravision, instrumentation displays and video games. In a binocular HMD separate views are presented to each of the user's left and right eyes. The use of separate views for each eye gives greater realism as the user is able to perceive stereo, or depth, effects.

It is common for the views to be generated by a computer using a digital imaging device such as a liquid crystal display. In such a system, each of the user's eyes is presented with a view from a separate image source. The presentation from the image source can be direct, reflected, partially reflected, or a combination of these. Often the views will partially overlap to provide a binocular view from the imager sources. This approach can be used, for example, to provide a stereo view. Another use for overlapping views is to have a high-resolution image source in one eye overlapping with a lower-resolution image source in the other eye. Typically, the high-resolution image is at the center of focus of the viewer—the point at which the viewer desires a high level of detail.

However, a problem exists with overlapping views from imager sources. This is because the boundary of overlap inevitably results in a visible line. In the case where a high-resolution image is overlapped within a low-resolution image, a visible line artifact around the high-resolution image conflicts with the desired view. The line is a result of the user's eye moving to reveal different areas within the viewfinder, sometimes disclosing portions of the edges of the physical image display device within the viewfinder such as the edges of a liquid crystal display panel used to produce the high-resolution image.

Thus, it is desirable to provide a system where line artifacts are minimized in imaging systems that overlay images presented to each eye.

SUMMARY OF THE INVENTION

The invention uses an aperture mask between the eye and a viewfinder to mask the line artifacts resulting from visible edges of a display device, or image source, used to generate an image for the eye. The aperture has a translucent area that matches the geometry of the display device edge desired to be masked. In an application where a high-resolution image is presented to one eye, centered within a lower-resolution image presented to the other eye, the aperture is positioned to mask the edges of the high-resolution image source. The aperture in this case has a translucent area adjacent to the image source edges and has an opaque area beyond the edges. In an application where see-through is desired, the opaque area can be sacrificed in favor of a partially transparent mask. Or only portions of the aperture mask can be opaque. In either application, the translucent area can be graduated so that a smooth transition area between the edges of the high-resolution display and the lower-resolution display is achieved.

One embodiment of the invention provides a viewing apparatus allowing a user to view a scene, the viewing apparatus includes a first viewer including a first image source presenting a first-resolution, first angle view of the scene to a first eye of the user; a second viewer including a second image source presenting a higher resolution, narrower angle view of the scene to a second eye of the user; and an aperture mask between the second image source and the second eye for masking the edges of the view of the scene produced by the second image source.

BRIEF DESCRIPTION OF THE DRAWINGS

FIG. 3 shows the left side and right side viewers of the present invention;

DESCRIPTION OF THE SPECIFIC EMBODIMENTS

Figure 1:
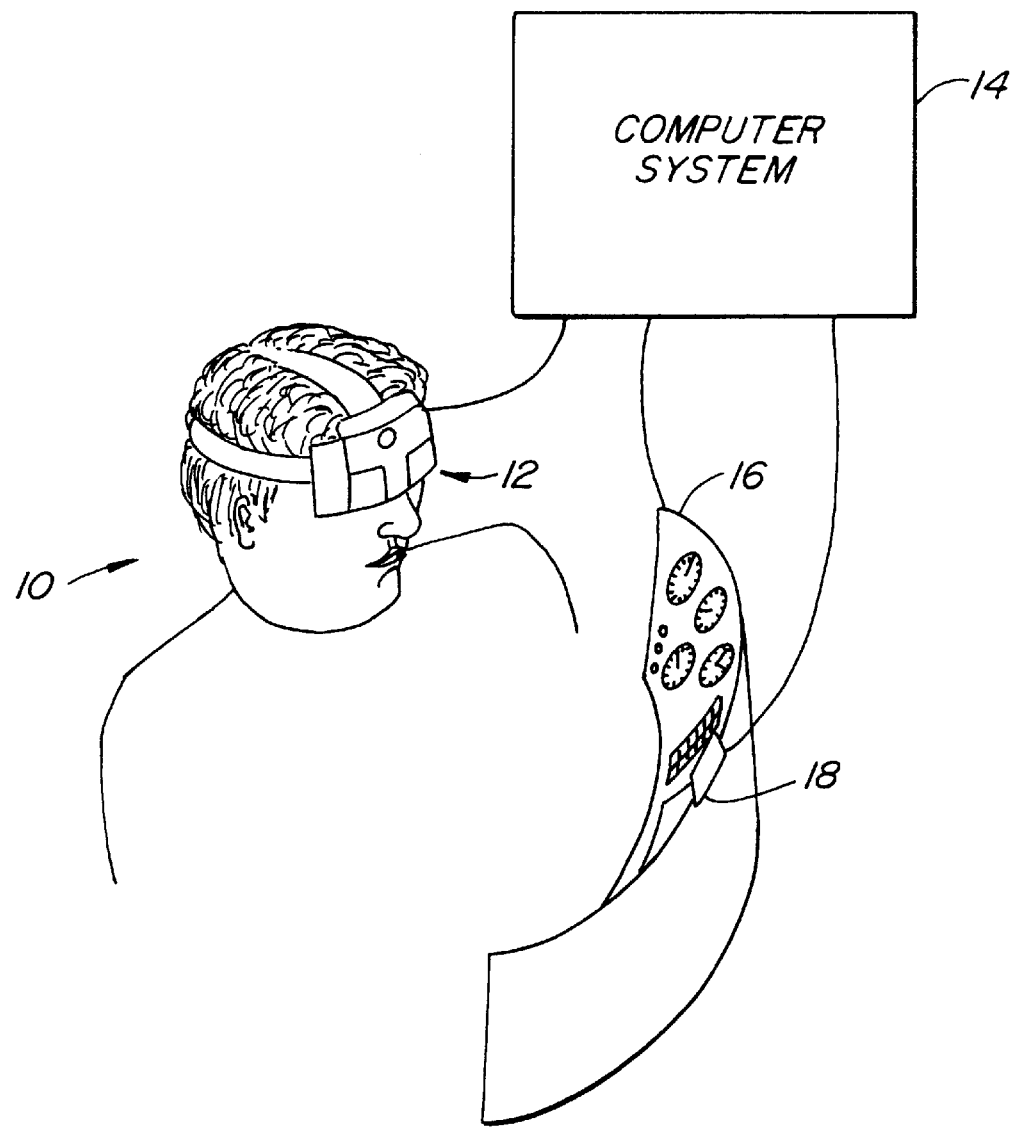
FIG. 1 illustrates the present invention used in a simulation system.

FIG. 1 shows an example of the present invention applied to a simulation system.

In FIG. 1, user 10 is participating in a flight simulator. Head Mounted Display (HMD) 12 is secured to the user's head and includes left and right viewers through which the user is presented scenes from computer image sources (not shown) incorporated into the HMD. Computer system 14 controls the image sources within HMD 12 and also controls the simulator's instrument panel 16 and other cockpit controls (not shown). Additionally, computer system 14 is connected to HMD position tracker 18 for the purpose of precisely determining the position and orientation of the HMD, and the user's line-of-sight, in space.

As is known in the art, computer system 14 computes a simulation view of any desired scene based on the user's head position. In this manner, users may move their heads about freely and their perceptions of the simulated scene will change in accordance with the head movements. This allows computer system 14 to generate a 360 field of view of a simulated environment. In the case of a flight simulation, user 10 manipulates instruments and controls. The resulting change in behavior of the simulated aircraft is calculated by the computer system and the appropriate simulated view is generated. Naturally, many frames per second are generated and the scenes are computed in real time and presented to the user to simulate actual behavior and flight characteristics of the aircraft used in the simulation.

Figure 2:
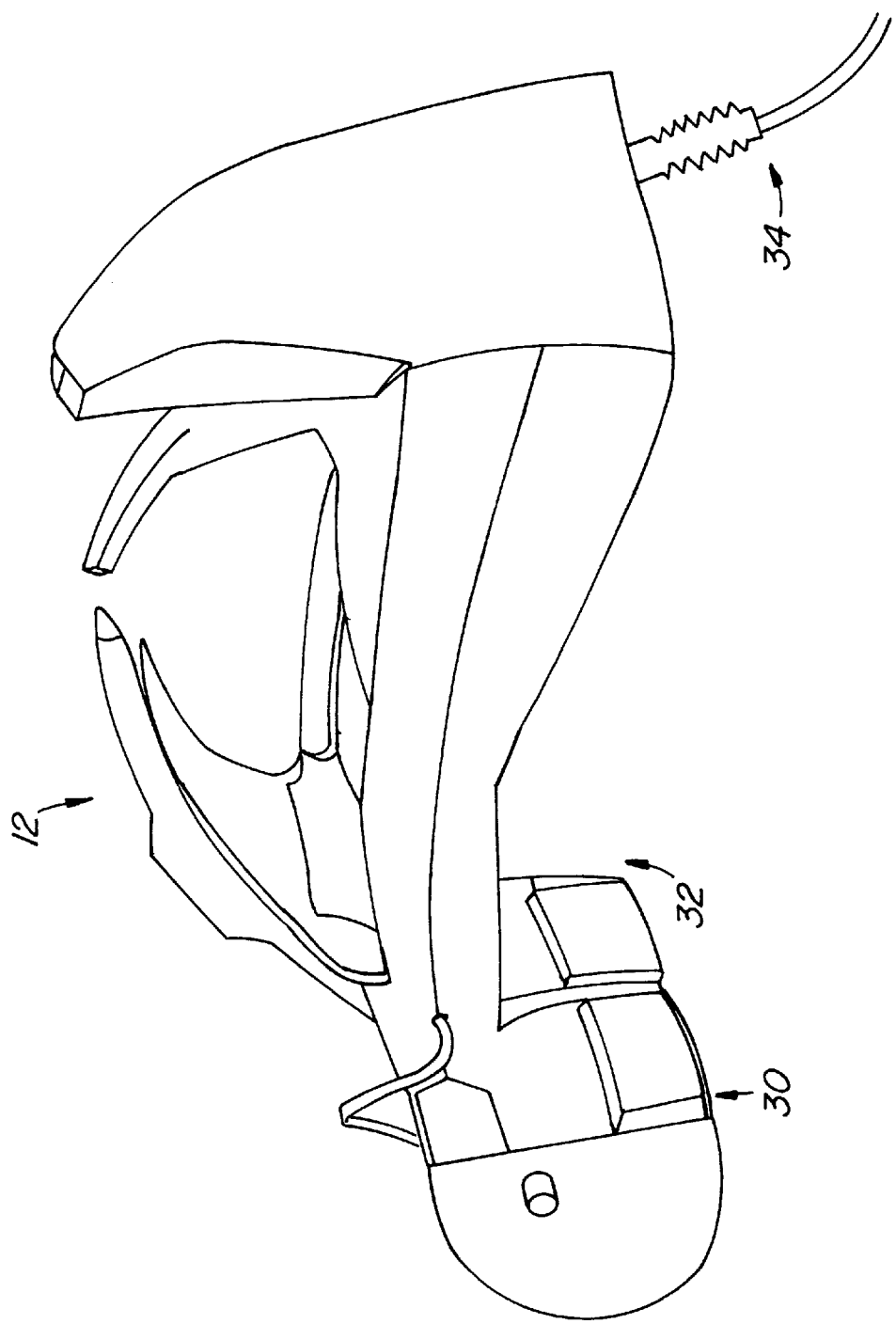
FIG. 2 shows a perspective view of a head-mounted display unit.

FIG. 2 shows an illustration of the head-mounted display 12 of FIG. 1.

FIG. 2 is an exterior depiction of a preferred embodiment of the invention incorporated into an HMD product called the "Monocular See-Through HiDef™ HMD System" or "MOST HiDef™ HMD." This product will be manufactured by Kaiser Electro-Optics, Inc. However, this design is but one of many that will be suitable to practice the invention.

FIG. 2 shows left eyepiece 30 and right eyepiece 32 as somewhat separate components of the HMD. As discussed below, these components are substantially operationally separate, also. Left and right eyepieces, or viewers, of HMD 12 operate optically independently of each other. Software in computer system 14 takes into account the interrelationship between the two imaged views presented to the user. Imaging information is transmitted along cable 34. This can be a video signal, digital signal from a computer, etc. The signal is used to generate views on image sources for the left and right viewers.

FIG. 3 shows cutaway mechanical views for the left and right viewers. Left viewer 30 provides an 80 diagonal, full-field-of-view imaged view to the user's left eye. This corresponds to viewer 30 of FIG. 2. Right viewer 32 presents a 40 diagonal imaged view to the user's right eye. This corresponds to viewer 32 of FIG. 2.

Left viewer 30 has image source 54 located in front of, and in-line with, the user's left eye 56. Collimating lenses at 58 focus the projected imaged scene at infinity. In the preferred embodiment, lenses similar to those disclosed in the Visual Immersion Module (VIM®) lens design of U.S. Pat. No. 4,859,031 are used. For the wide-field, non-see through module, however, any suitable optical arrangement can be used. Image source 54 is a liquid crystal display (LCD) device with a power supply and backlight source to provide a projected image. The signal interface to image source 54 is at 60. Image signal information received from cable 34 of FIG. 2 is coupled to the interface 60. The Inter-pupillary Distance (IPD) adjusting mechanism at 62 allows for changing the optics for different users' visions.

Referring to right viewer 32, similar components are used, although in a different arrangement. Image source 70 is an LCD image source identical with image source 54. Image source 70 is coupled to the image signal source via interface board 72, which is identical to interface board 60. An IPD adjusting mechanism at 74 serves to adjust for the user's specific right eye vision.

Notably, image source 70 is not directly in front of the user's right eye 76. Instead, image source 70 is offset from the user's direct line of vision. The projected image from image source 70 is focused through lens 82. A portion of the projected image from image source 70 is reflected from beam-splitter 78 toward dual-reflector/combiner 80. Dual reflector/combiner 80 reflects the projected image back towards beam-splitter 78 where a portion of the incident light passes through beam-splitter 78 and through aperture 88 to impinge on the user's right eye 76.

By proper choice and coordination of image source 70 and lens 82, the projected image produced is a 40 diagonal field of view at the same resolution of image source 54 which produced an 80 diagonal field of view. Thus, projected image from image source 70 through lens 82 is a narrower field of view but at a higher resolution of four times the pixels per area. This higher resolution, narrower field of view image occupies only a portion of the user's overall field of view through right viewer 32. In the preferred embodiment, the higher resolution, narrower field of view projected image is centered within the user's right-eye field of view.

Right viewer 32 also presents a view of the outside world via the see-through path illustrated by line 84. Light from the outside environment passes through dual reflector/combiner 80 and through beam splitter 78 and aperture 88 to impinge on the user's right eye 76. The effect that the user perceives is that of a superimposition of the projected image from image source 70 and light from the outside environment.

Figure 4A:
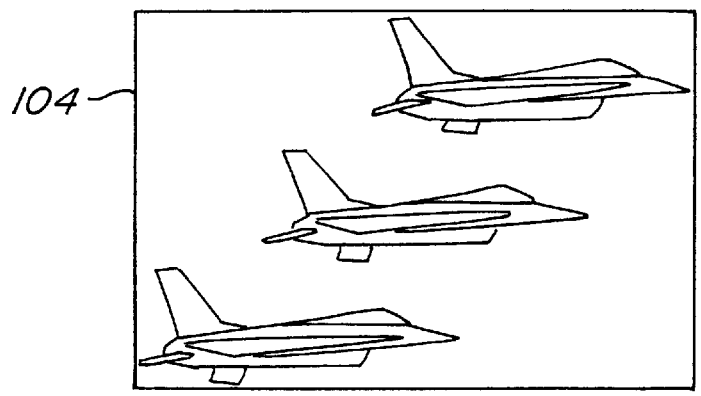
FIG. 4A shows the view through the low-resolution wide angle viewer.
Figure 4B:
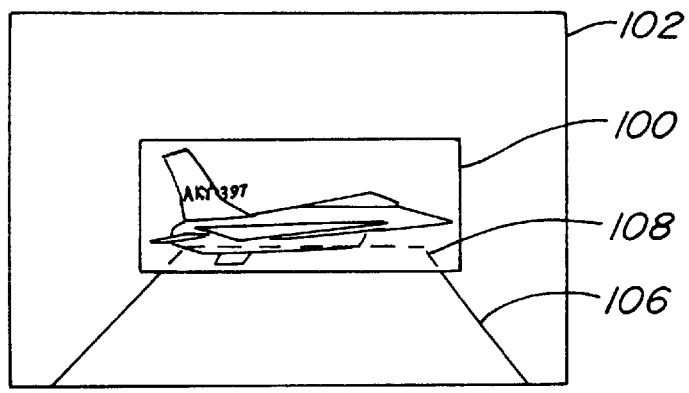
FIG. 4B shows the view through the right side, high resolution, narrow view viewfinder.
Figure 4C:
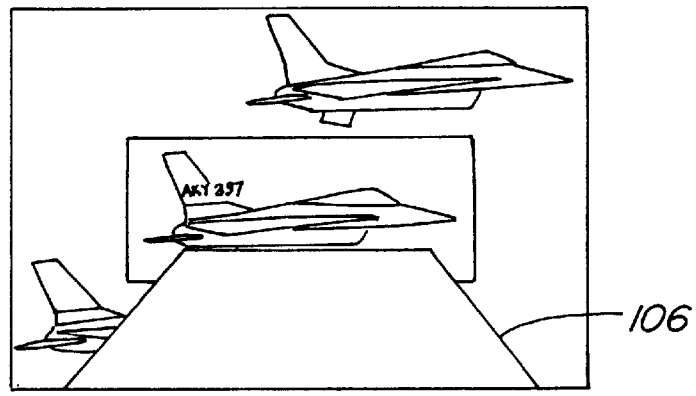
FIG. 4C shows a user's perceived view of the composite scene of the left and right viewers.

FIGS. 4A–C illustrate scenes, or views, through the left and right viewers and show the perceived combination of views resulting from the presentation of images and the user's physiology.

FIG. 4A shows an example view through the left viewer. In the application of an aircraft simulator, a typical scene would include other aircraft, as shown in FIG. 4A. Since this is the left-eye view, the image of FIG. 4A is an 80 field of view at a relatively lower resolution. Also, the image in the left viewer shown in FIG. 4A is a fully-imaged view; that is, it results solely from computer-generated data.

FIG. 4B shows the view through the right-eye viewer. In FIG. 4B, window 100 represents the 40 field of view at relatively high resolution. Note that window 100 is centered within the overall field of view represented by window 102. The field of view of window 100 is matched to the left-eye viewer field of view window 104. That is, window 100 is a higher resolution image of a portion of window 104. The image in window 100 may also be adjusted to provide depth cues, for example, as in stereo images. Also visible within the right eye field of view window 102 are any objects from the real-world environment surrounding the user such as a mock-up instrument console 106. Note that console 106 is shown extending into the imaged view of window 100. This overlap, or superimposition, of the two images is shown by a dotted line 108 illustrating the outline of instrument console 106.

Because of well-known physical and psychological viewing properties of humans, the result of presenting the images of FIGS. 4A and 4B to a user's left and right eyes, respectively, is shown in FIG. 4C. That is, the views of the left and right eyes are combined so that an overall image of a wide-angle low resolution view; plus a narrower angle, higher resolution view along with a view of the outside environment results in a perceived single scene. This gives the advantage of showing the user's center of interest in high resolution while providing a wider, lower resolution, overall field of view. Note that the user is also able to view non-simulated objects such as the instrument console 106. A refinement to the presentation is that both the low resolution and the high resolution images are "clipped" to a predetermined mask of the instrument console. Such clipping is accurately done in real time using the updated position of the head-mounted display. In other words, as the user's head moves, the computer determines the new position of the instrument console and masks off any portions of the low resolution or high resolution images that would overlap with the console, thus providing the user with an unobstructed view of the console.

Figure 5A:
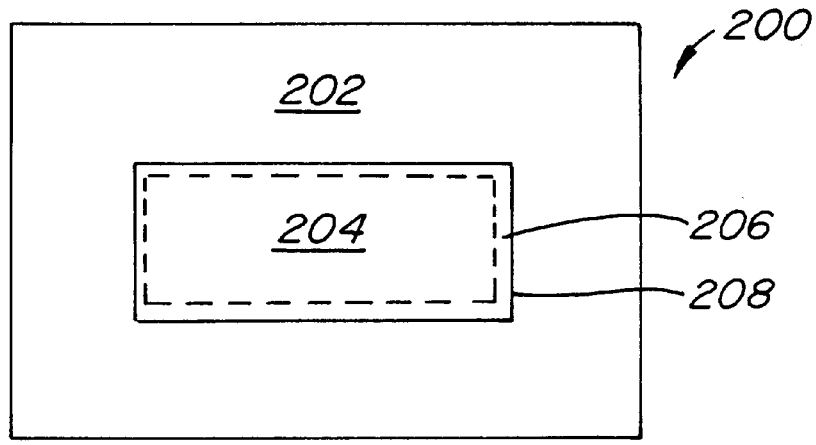
FIG. 5A is a first aperture mask.

FIG. 5A shows an aperture design 200 suitable for use as aperture 88 in FIG. 3. Aperture design 200 includes an opaque area 202 for complete masking, a cutout 204 for no masking, a translucent transition area 206 for partial masking. Edge 208 defines a window that is slightly larger than window 100 of FIG. 4B. The dimensions of aperture design 200 place the edges of the high-resolution image source window 100 within translucent transition area 206. This results in a softening of the demarcation line that results from overlapping of the high-resolution image with the lower-resolution image. A problem with this design is that the use of an opaque mask interferes with the see-through of the preferred embodiment. However, an opaque mask design is suitable in cases where no see-through is desired.

Figure 5B:
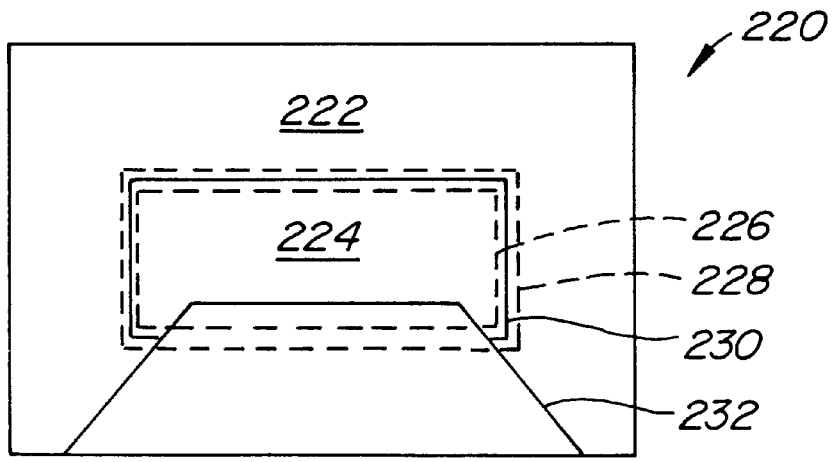
FIG. 5B is a second aperture mask.

FIG. 5B shows aperture design 220 that is more suitable for the preferred embodiment which allows for see-through in the high-resolution viewfinder. In aperture design 220, are 222 is transparent to allow for see-through. Area 224 is also transparent and can be a cutout, clear glass, etc. A smooth transition area exists between edges 226 and 228 which is translucent to soften the edges 230 of the image source device. This allows for the surrounding environment, such as instrument console 232 to be visible through the aperture while, at the same time, softening the undesirable edge of the image source device.

Figure 5C:
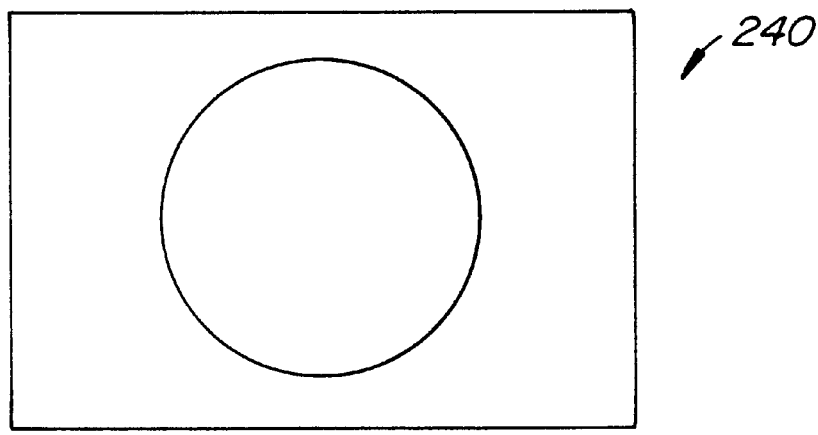
FIG. 5C is a third aperture mask.

Any suitable aperture cutout can be employed. FIG. 5C shows an aperture design 240 with a circular cutout. Different areas of the aperture can be opaque, transparent (e.g., cutout), or translucent, as desired, to achieve the effect of softening or masking the unwanted image source device edges. Other edges, such as edges created by a "luning" effect when two images from differen image sources are overlapped, can be softened or masked in this manner. The translucent area can be uniform or varying.

It is possible to place the aperture at different positions within the optical paths shown for the right viewfinder in FIG. 3. For example, aperture 88 can be placed inside of the housing on either side of the beamsplitter. The aperture can be placed near the image source, either in front of, or behind lens 82.

Thus, an improved viewing system has been disclosed. Although the system has been described with respect to a specific embodiment, it should be apparent that many variations from the specific embodiment are possible while remaining within the scope of the invention. For example, the image sources may be of many types, such as video, fiber optic, plasma, micromirror, etc. Although an external computer system is used, the invention may be achieved with embedded processing or without the aid of a computer. For example, predefined digital images, or text and numeric information, can be stored within a portable head-mounted display. These images can later be presented to the left and right eyes in accordance with the discussion above. Another application for the invention is for vision enhancement as in night sight or infrared viewing devices. In these cases, the imaged views can be generated by image intensifiers, low light television cameras or infrared sensors.

The image source modules may also be used to display symbology, such as the symbology displayed on a pilot's aircraft head-up display. The adaptation of the invention to these applications should be readily understood by one of skill the art. Different apparatus or methods can be employed to perform various functions discussed herein. For example, the function performed by tracker 18 can be achieved by optical, mechanical, inertial, electromagnetic, ultrasonic, etc., designs. Analysis software can be used to communicate theorientation of the user's head to either the computer image generator, camera or sensor. The invention can be adapted for use in a virtual retinal display approach. The field-of-view can be increased by using multiple image sources arranged in a tiling, partial overlap scheme. Many substitutions, arrangements, or replacements of components are possible which will provide a system that can adequately implement the invention. Thus, the scope of the invention is to be determined solely by the appended claims.

What is claimed is:

1. A viewing apparatus allowing a user to view a scene, the viewing apparatus comprising:
   a first viewer including a first image source presenting a first-resolution, first angle view of the scene to a first eye of the user;
   a second viewer including a second image source presenting a higher resolution, narrower angle view of the scene to a second eye of the user; and
   an aperture mask between the second image source and the second eye for masking the edges of the view of the scene produced by the second image source.

2. The viewing apparatus of claim 1, wherein the aperture mask includes
   a translucent portion about the edges of the view of the scene so that a smooth transition between the higher resolution, narrower angle view and the first-resolution, first angle view of the scenes is achieved.

3. The viewing apparatus of claim 2, wherein projected light is emitted by the second image source in a linear direction to create a projected view of the scene, the second viewer further comprising:
   a dual reflecting/combining lens;
   a beamsplitter;
   a sight guide for securing the beamsplitter and dual reflecting/combining lens in position, and for orienting the second eye of the user so that light from the user's surroundings passes through the dual reflecting/combining lens, the beamsplitter and the aperture mask to impinge on the second eye, wherein the projected light emitted by the second image source reflects from the beamsplitter to the dual reflecting/combining lens which reflects the projected light back through the beamsplitter and aperture mask to impinge on the second eye thus presenting the second eye with simultaneous imaged and non-imaged views.

4. The viewing apparatus of claim 3, further comprising:
   a head mounted display for securing the first and second viewers to the user's head.

5. The viewing apparatus of claim 4, further comprising:
   a digital image interface coupled to the first and second image sources for accepting signals representing predetermined scenes for presentation to the user's eyes through the image sources.

6. The viewing apparatus of claim 5, further comprising
   a computer coupled to the digital image interface, wherein the computer is used to generate images of the scene for display by the image sources;
   a position tracking mechanism fixedly coupled to the head mounted display for tracking the position of the head mounted display and for providing position information to the computer; and
   software executing on the computer for generating scene images for display on the image sources in response to the position information.

7. The viewing apparatus of claim 5, further comprising:
   multiple image sources arranged in a tiled manner in one or more of the viewers.

8. The viewing apparatus of claim 5, wherein at least one of the viewers includes
   a retinal display device.

9. A head mounted display system comprising:
   a first viewer including a first image source presenting a first-resolution, first angle imaged view of the scene to a first eye of the user;
   a second viewer including a second image source presenting a higher resolution, narrower angle imaged view of the scene to a second eye of the user; and
   an aperture mask between the second image source and the second eye for masking the edges of the view of the scene produced by the second image source.

\* \* \* \* \*